(12) United States Patent
Kuriyagawa et al.

(10) Patent No.: US 9,721,700 B2
(45) Date of Patent: Aug. 1, 2017

(54) WATER-STOP STRUCTURE FOR ELECTRICAL WIRE, AND METHOD FOR MANUFACTURING SAME

(71) Applicant: YAZAKI CORPORATION, Minato-ku, Tokyo (JP)

(72) Inventors: Masaru Kuriyagawa, Tochigi (JP); Jun Tachibana, Tochigi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/875,802

(22) Filed: Oct. 6, 2015

(65) Prior Publication Data
US 2016/0027552 A1 Jan. 28, 2016

Related U.S. Application Data

(63) Continuation of application No. PCT/JP2014/060387, filed on Apr. 10, 2014.

(30) Foreign Application Priority Data

Apr. 10, 2013 (JP) .................. 2013-081977

(51) Int. Cl.
*H02G 15/04* (2006.01)
*H01B 7/285* (2006.01)
(Continued)

(52) U.S. Cl.
CPC ........... *H01B 7/285* (2013.01); *H01B 13/003* (2013.01); *H01B 13/0013* (2013.01);
(Continued)

(58) Field of Classification Search
CPC .......... H01B 7/285; H01B 7/00; H01B 7/282; H01B 7/2825; H01B 7/28; H01B 13/0013;
(Continued)

(56) References Cited

U.S. PATENT DOCUMENTS 3,875,323 A 4/1975 Bopp et al.
6,258,954 B1 7/2001 Kunimoto et al.
(Continued)

FOREIGN PATENT DOCUMENTS

CN 1374995 A 10/2002
CN 1574108 A 2/2005
(Continued)

OTHER PUBLICATIONS

Official Action issued on Oct. 17, 2016 in the counterpart Chinese application.
(Continued)

*Primary Examiner* — Angel R Estrada
(74) *Attorney, Agent, or Firm* — Mots Law, PLLC (57) ABSTRACT

A water-stop structure for electrical wire includes: a terminal including an electrical wire connection portion; and an electrical wire in which an outer circumference of a conductor including a plurality of single wires is coated with an insulation coating portion and which is swaged to be fixed to the electrical wire connection portion, a water-stop agent being filled into a gap in the insulation coating portion to thereby perform water stop in the electrical wire. The water-stop agent includes a fluorescent agent.

3 Claims, 9 Drawing Sheets

(51) Int. Cl.
*H02G 1/14* (2006.01)
*H01B 13/00* (2006.01)
*H01B 13/32* (2006.01)

(52) U.S. Cl.
CPC .............. *H01B 13/32* (2013.01); *H02G 1/14* (2013.01); *H02G 15/04* (2013.01)

(58) Field of Classification Search
CPC ........ H01B 7/20; H01B 13/003; H01B 13/32; H01R 4/20; H01R 4/185; H01R 3/24; H01R 13/03; H01R 13/00; H01R 4/70; H01R 13/52; H01R 13/5216; H01R 13/5221; H02G 1/14; H02G 15/04
USPC .......... 174/23 R, 72 A, 650, 20, 84 C, 77 R; 439/604, 203
See application file for complete search history.

(56) References Cited

U.S. PATENT DOCUMENTS

| | | | | |
|---|---|---|---|---|
| 6,517,381 B2* | 2/2003 | Kondo | .................... | H01R 4/70 439/604 |
| 6,613,263 B2* | 9/2003 | Kondo | .................... | H01R 4/70 264/263 |
| 6,761,551 B2* | 7/2004 | Kondo | .............. | H01R 13/5216 425/116 |
| 8,076,572 B2* | 12/2011 | Sawai | ................... | H02G 15/04 174/23 R |
| 8,146,248 B2* | 4/2012 | Nishimura | .............. | H01B 3/28 174/28 |
| 8,304,649 B2* | 11/2012 | Arai | ...................... | H01B 7/285 174/23 R |
| 8,723,040 B2* | 5/2014 | Sakura | ................... | H01R 4/185 174/72 A |
| 8,771,015 B2* | 7/2014 | Inoue | ...................... | H01R 4/70 439/604 |
| 9,065,261 B2* | 6/2015 | Kawamura | ............ | H01R 4/183 |
| 9,293,838 B2* | 3/2016 | Sakaguchi | ............... | H01R 4/62 |
| 2004/0238200 A1 | 12/2004 | Tanaka et al. | | |
| 2008/0185169 A1 | 8/2008 | Daito | | |
| 2008/0283268 A1 | 11/2008 | Iwasaki et al. | | |
| 2009/0166559 A1 | 7/2009 | Levandoski et al. | | |
| 2010/0212936 A1 | 8/2010 | Arai | | |

FOREIGN PATENT DOCUMENTS

| | | |
|---|---|---|
| CN | 101094902 A | 12/2007 |
| CN | 101237109 A | 8/2008 |
| CN | 101248558 A | 8/2008 |
| JP | S57-132255 | 8/1982 |
| JP | H05-331438 A | 12/1993 |
| JP | H11-180184 A | 7/1999 |
| JP | 2006-202697 A | 8/2006 |
| JP | 2008-522006 A | 6/2008 |
| JP | 2008-186675 A | 8/2008 |
| JP | 2009-054406 A | 3/2009 |
| JP | 2009-135073 A | 6/2009 |
| JP | 2010-032962 A | 2/2010 |

OTHER PUBLICATIONS

Official Action issued on May 4, 2016 in the counterpart Chinese application.
A Decision of Rejection issued on Jan. 9, 2017 in the counterpart Chinese application.
An Official Action issued on Feb. 14, 2017 in the counterpart Japanese application.
Official Action issued on May 23, 2017 in the counterpart Japanese patent application.

* cited by examiner

WATER-STOP STRUCTURE FOR ELECTRICAL WIRE, AND METHOD FOR MANUFACTURING SAME

CROSS REFERENCE TO RELATED APPLICATIONS

This application is a continuation application of International Application No. PCT/JP2014/060387, filed on Apr. 10, 2014, which claims priority to Japanese Patent Application No. 2013-081977, filed on Apr. 10, 2013, the entire contents of which are incorporated by reference herein.

BACKGROUND

1. Technical Field

The present invention relates to a water-stop structure for electrical wire for preventing the intrusion of liquids such as water, oil, and the like into the electrical wire, and a method for manufacturing the same.

2. Description of the Related Art

For example, a ground terminal used in an engine room of a vehicle, and electrical wire connected to the ground terminal are assumed to get wet. When there is gap in the electrical wire, the water may pass through the electrical wire to reach the other end side and to get an electric device (e.g., connector) wet on the other end side of the electrical wire, due to weight of water, capillary action, change of air pressure between both ends of the electrical wire, and the like. In order to prevent the electrical wire from getting wet with such water (including a fluid such as oil) passing through the electrical wire, various types of electrical wire water-stop structures have been proposed (refer to Japanese Patent Laid-Open Publication No. 2008-186675 (Patent Literature 1)).

Figure 8:
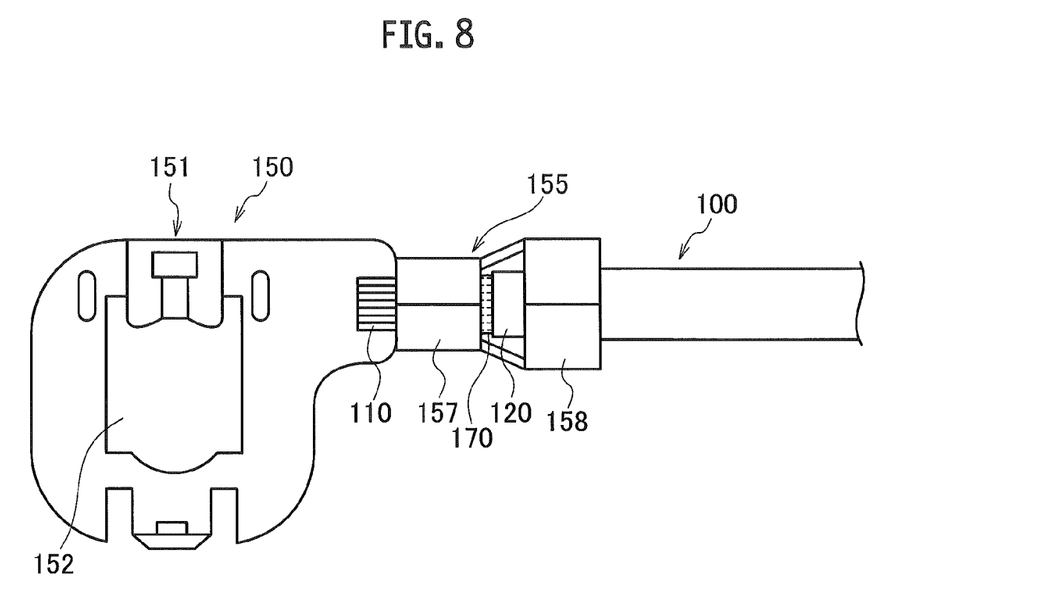
FIG. 8 is a plane view illustrating a conventional water-stop structure for electrical wire.

FIG. 8 illustrates the water-stop structure for an electrical wire 100 described in Patent Literature 1, and a terminal (grounding terminal) 150 is mounted to an end terminal of the electrical wire 100.

The electrical wire 100 is formed of a conductor 110 including a plurality of single wires, and an insulation coating portion 120 coating an outer circumference of the conductor 110. The conductor 110 is exposed by peeling off a skin of the insulation coating portion 120 at the end terminal portion.

A terminal 150 is formed of an electrical connection portion 151 and an electrical wire connection portion 155 integrated with the electrical connection portion 151. The electrical connection portion 151 performs connection with an external device (e.g., vehicle), and there is formed a bolt insertion hole 152 into which a bolt is inserted from the external device. The electrical wire connection portion 155 includes a conductor swaging portion 157 for swaging and fixing the conductor 110 of the electrical wire 100, and a coating swaging portion 158 for swaging and fixing the insulation coating portion 120 thereof.

A water-stop agent 170 adheres to an exposed part or the like of the conductor 110, and is also filled in the insulation coating portion 120, by permeation. The permeated water-stop agent 170 prevents the intrusion of water into the electrical wire 100.

Figure 9:
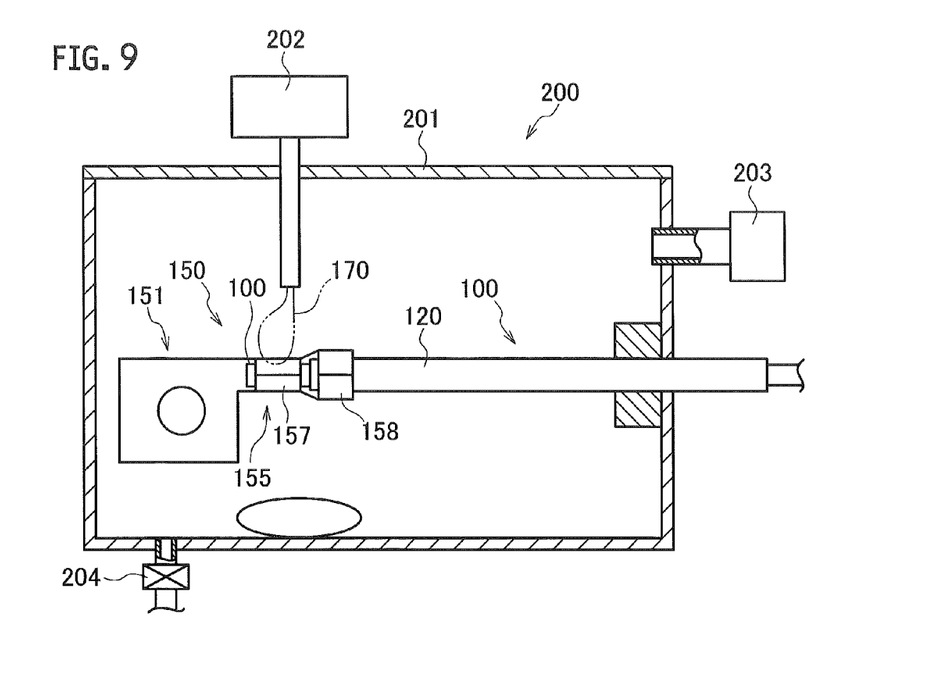
FIG. 9 is a cross-sectional view of the conventional water-stop structure for the electrical wire.
Figure 10:
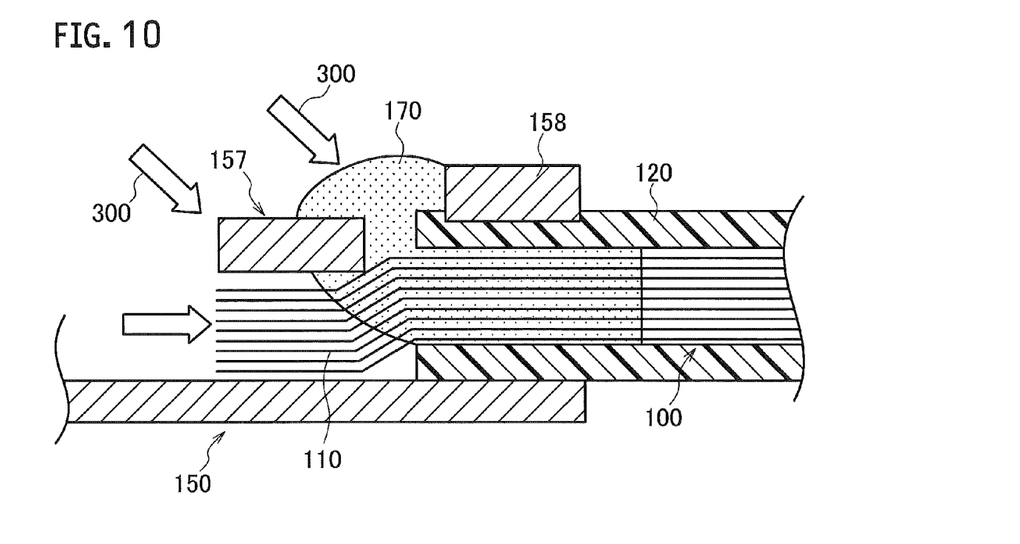
FIG. 10 is a cross-sectional view illustrating a state where the water-stop agent permeates an insulation coating portion by pressurized air.

FIG. 9 also illustrates an electrical wire water-stop device 200 described in the Patent Literature 1, and FIG. 10 illustrates a state where, in the electrical wire water-stop device 200, the water-stop agent 170 permeates the insulation coating portion 120. As illustrated in FIG. 9, in the electrical wire water-stop device 200, the electrical wire 100 is set in a treatment chamber 201 that can be sealed, and then the water-stop agent 170 is filled. A water-stop agent dropping device 202 for dropping the water-stop agent is provided in the treatment chamber 201. Furthermore, an air supply device 203 is provided at a side wall part, and an exhaust device 204 is provided at a bottom wall part.

As simple description of water-stop treatment, first, the terminal 150 is positioned in the treatment chamber 201. Subsequently, the liquid water-stop agent 170 is dropped between the conductor swaging portion 157 and the insulation portion swaging portion 158 from the water-stop agent dropping device 202. At a same time or after dropping the water-stop agent 170, pressurized air is supplied into the treatment chamber 201 from the air supply device 203 to thereby make a high-pressure state in the treatment chamber 201. Then, as illustrated in FIG. 10, the water-stop agent 170 permeates the gap in the insulation coating portion 120 by pressure of pressurized air 300. Subsequently, the exhaust device 204 decreases the pressure in the treatment chamber 201 to finish the treatment. The water-stop agent 170 is hardened by humidity in the air.

Whether or not the water-stop agent 170 is filled in the insulation coating portion 120 without the gap is determined by checking an adherence state of the water-stop agent 170 to a surface of the conductor 110 or the like.

SUMMARY OF THE INVENTION

However, when the water-stop agent 170 is transparent or has light coloration, an adherence state of the water-stop agent 170 may not be visually and clearly determined. Particularly, when silicone agent is used as the water-stop agent 170, the adherence state of the water-stop agent is hard to be visually determined since the silicone agent is transparent.

An object of the present invention is to provide, even when the water-stop agent is transparent or has light coloration, a water-stop structure for electrical wire in which the adherence state of the water-stop agent can be visually and easily confirmed and a method for manufacturing the water-stop structure.

According to a first embodiment of the present invention, a water-stop structure for electrical wire includes: a terminal including an electrical wire connection portion; and an electrical wire in which an outer circumference of a conductor including a plurality of single wires is coated with an insulation coating portion and which is swaged to be fixed to the electrical wire connection portion, a water-stop agent being filled into a gap in the insulation coating portion to thereby perform water stop in the electrical wire, wherein the water-stop agent includes a fluorescent agent.

According to a second embodiment of the present invention, a water-stop structure for electrical wire includes: a conductor including a plurality of single wires; and an insulation coating portion coating an outer circumference of the conductor, a water-stop agent being filled into a gap in the insulation coating portion to thereby perform water stop in an electrical wire, wherein the water-stop agent includes a fluorescent agent.

According to a third embodiment of the present invention, a method of manufacturing a water-stop structure for electrical wire including a terminal including an electrical wire connection portion and an electrical wire in which an outer circumference of a conductor including a plurality of single wires is coated with an insulation coating portion and which is swaged to be fixed to the electrical wire connection portion, a water-stop agent being filled into a gap in the insulation coating portion to thereby perform water stop in the electrical wire, the method includes: a step of dropping the water-stop agent including a fluorescent agent onto an exposed part of the conductor exposed by peeling off the insulation coating portion; a water-stop agent permeating step of generating a pressure difference between an ambient pressure of a part where the water-stop agent is dropped and an inner pressure of the insulation coating portion to thereby pour the water-stop agent into the insulation coating portion; and an inspection step of irradiating the exposed part of the conductor in which the water-stop agent is dropped, with black light.

According to a fourth embodiment of the present invention, a method of manufacturing a water-stop structure for electrical wire including a conductor including a plurality of single wires and an insulation coating portion coating an outer circumference of the conductor, a water-stop agent being filled into a gap in the insulation coating portion to thereby perform water stop in an electrical wire, the method includes: a step of dropping the water-stop agent including a fluorescent agent onto an exposed part of the conductor exposed by peeling off the insulation coating portion; a water-stop agent permeating step of generating a pressure difference between an ambient pressure of a part where the water-stop agent is dropped and an inner pressure of the insulation coating portion to thereby pour the water-stop agent into the insulation coating portion; and an inspection step of irradiating the exposed part of the conductor in which the water-stop agent is dropped, with the black light.

The water-stop agent including the fluorescent agent may be a silicone agent. The electrical connection portion may also be irradiated with the black light.

According to the present invention, the water-stop agent flashes by irradiation with black light since the fluorescent agent is added to the water-stop agent. Therefore, an adherence state of the water-stop agent can be easily and visually confirmed, and whether or not the water-stop agent has been suitably filled into the electrical wire can be easily and appropriately checked based on the adherence state of the water-stop agent.

BRIEF DESCRIPTION OF THE DRAWINGS

FIGS. 1A to 1C illustrate a water-stop structure for electrical wire according to a first embodiment of the present embodiment.

FIGS. 5A to 5C illustrate a second embodiment of the present invention.

FIGS. 6A to 6C illustrate a third embodiment of the present invention.

FIGS. 7A to 7C illustrate a fourth embodiment of the present invention.

DESCRIPTION OF THE EMBODIMENTS

Hereinafter, embodiments of the present invention will be described. In each embodiment, the same reference sign is attached to the same member and is made to correspond.

[First Embodiment]

FIGS. 1 to 4 illustrate a water-stop structure 1 for electrical wire 3 having a terminal according to a first embodiment of the present invention. As illustrated in FIGS. 1A to 1C, and FIG. 4A, the electrical wire 3 is connected with a terminal 5 at its end portion. The water-stop structure 1 is formed on a side of the electrical wire 3 to which the terminal 5 is connected. Details will be described below.

Figure 1A:
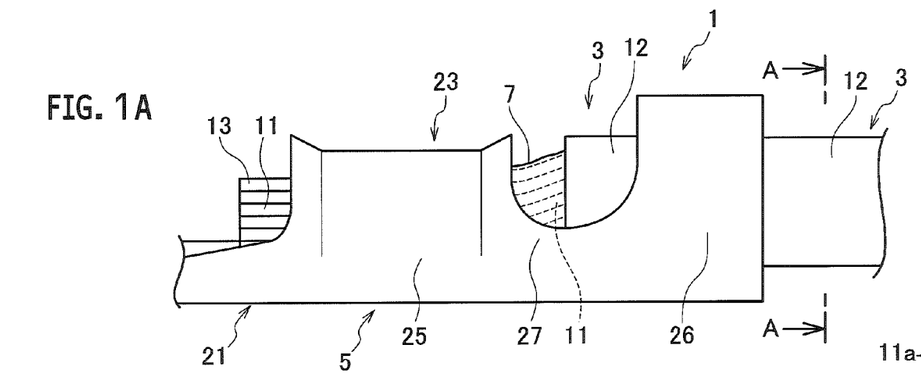
FIG. 1A is a side surface view of a water-stop structure for electrical wire.
Figure 1B:
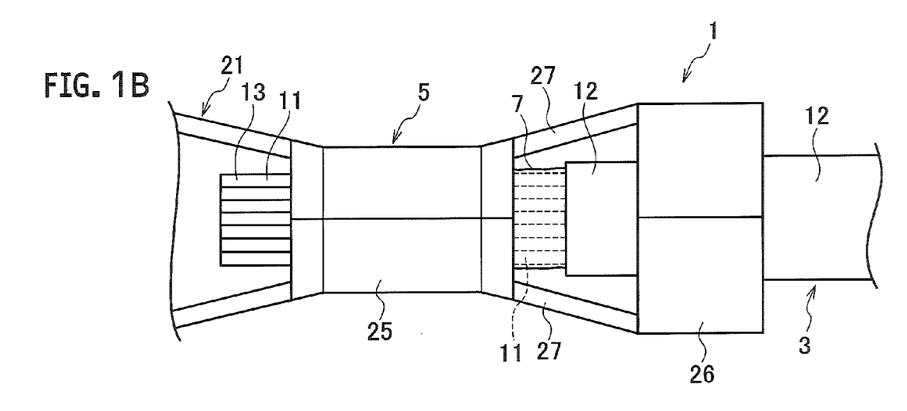
FIG. 1B is a plane view of the water-stop structure for the electrical wire.
Figure 1C:
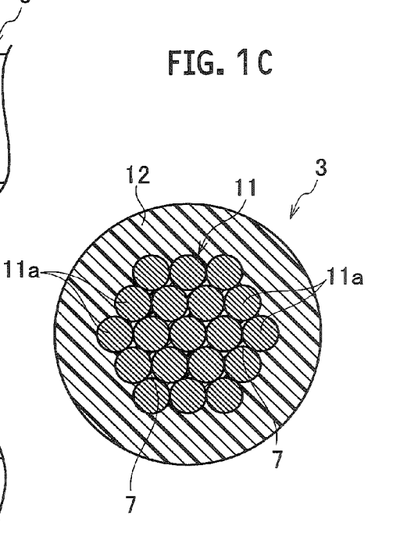
FIG. 1C is an enlarged cross-sectional view taken along a line A-A illustrated in FIG. 1A.

The electrical wire 3 is formed of a conductor 11 including a plurality of single wires 11a, and an insulation coating portion 12 coating an outer circumference of the conductor 11. At the end portion of the electrical wire 3, an end terminal part of the conductor 11 is exposed by peeling off the insulation coating portion 12.

The terminal 5 is formed by stamping out a mother material of conductive metal material into a predetermined shape by press processing, and performing bending processing on the conductive metal material in the predetermined shape. The terminal 5 includes an electrical connection portion 21 and an electrical wire connection portion 23. The electrical connection portion 21 connects with a terminal on the other side, and the like. A bolt insertion hole 24 is formed at the electrical connection portion 21. For example, when the terminal is ground-connected to a vehicle, the terminal is connected thereto with a bolt. The electrical wire connection portion 23 includes a conductor swaging portion 25, and a coating swaging portion 26 integrally and sequentially provided via a side wall portion 27. The conductor swaging portion 25 swages and fixes the conductor 11 exposed from the insulation coating portion 12. The coating swaging portion 26 swages and fixes the end terminal part of the insulation coating portion 12.

The water-stop agent 7 adheres onto the conductor 11 exposed from the insulation coating portion 12, and is filled into a gap in the insulation coating portion 12, by permeation. The water-stop agent 7 is filled into an entire gap in the insulation coating portion 12, namely, a gap in single wires 11a of the conductor 11. Note that, as illustrated in FIGS. 1A, 1B and the like, a portion of the conductor 11 whose outer circumference is covered with the water-stop agent 7 is indicated with broken lines, and the water-stop agent 7 covering the conductor 11 is indicated with a solid line.

Figure 4A:
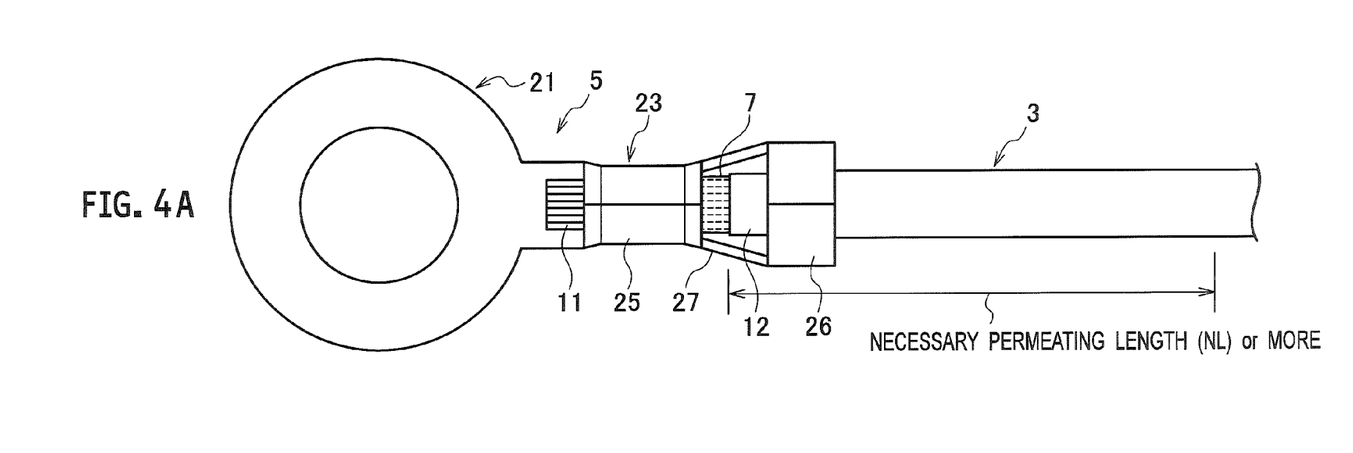
FIG. 4A is a plane view when the electrical wire having a terminal subjected to the water-stop treatment according to the first embodiment is non-defective.

A length of the water-stop agent 7 permeating the insulation coating portion 12 is, as illustrated in FIG. 4A, a necessary permeating length NL or more. The necessary permeating length NL varies depending on installation environment (specification) and the like of the electrical wire 3.

The water-stop agent 7 is a silicone agent (silicone resin) including a fluorescent agent. The silicone agent is a liquid and has flowability when the agent is not in contact with air, but the agent has a natural hardening property for hardening itself with moisture. The silicone resin hardened with moisture is obtained by mixing a silicone oligomer that is main component, with a hardening catalyst promoting a hardening reaction under the existence of moisture.

Figure 2:
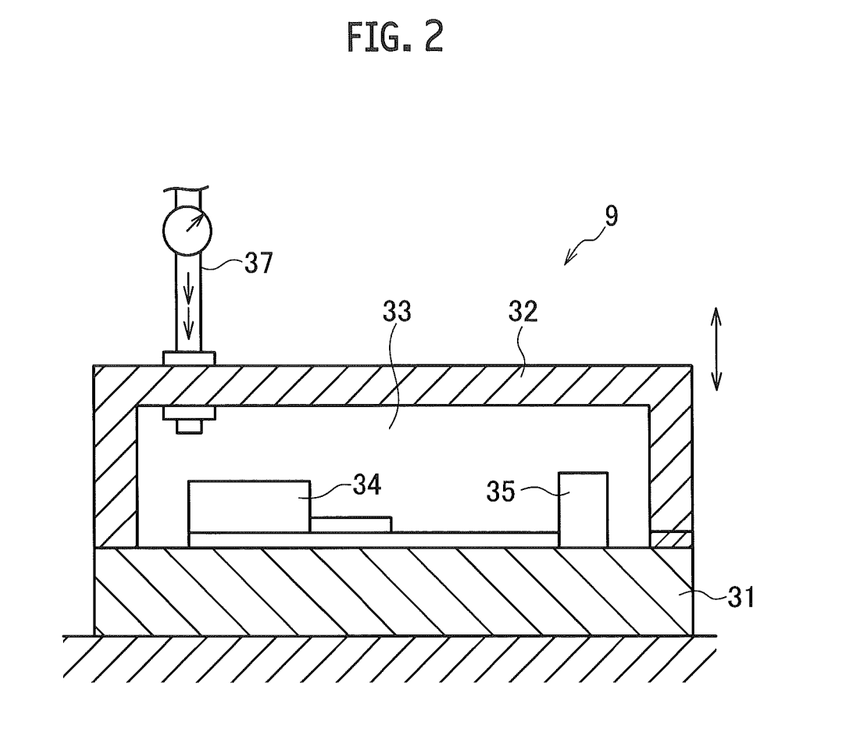
FIG. 2 is a cross-sectional view of an electrical wire water-stop device for electrical wire according to a first embodiment.

Subsequently, an electrical wire water-stop device 9 performing the water-stop treatment on the electrical wire 3 will be described. As illustrated in FIG. 2, the electrical wire water-stop device 9 includes a fixing board 31, and an upper cover 32 that vertically moves with respect to the fixing board 31 and is covered over the fixing board 31 by moving downward. A sealed chamber 33 is formed by covering the upper cover 32 over the fixing board 3. Terminal positioning portions 34 and 35 are provided on the fixing board 31, at two points. The terminal 5 can be positioned by the terminal positioning portions 34 and 35.

A high-pressure piping 37 connected to a pressure device (not illustrated) is mounted on an upper wall of the upper cover 32. The pressurized air can be supplied into the sealed chamber 33 from the pressure device, via the high-pressure piping 37.

Figure 3A:
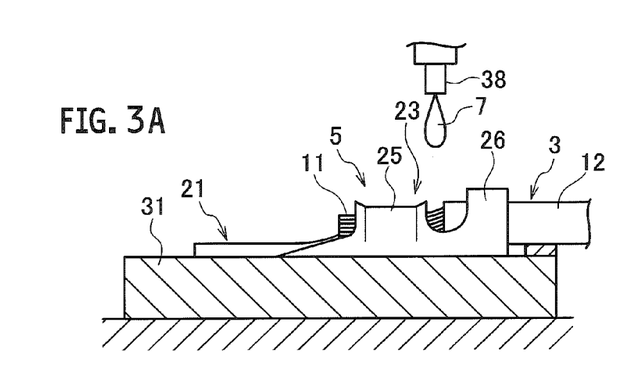
FIGS. 3A to 3D are side surface views in each process of a water-stop treatment according to the first embodiment.
Figure 3B:
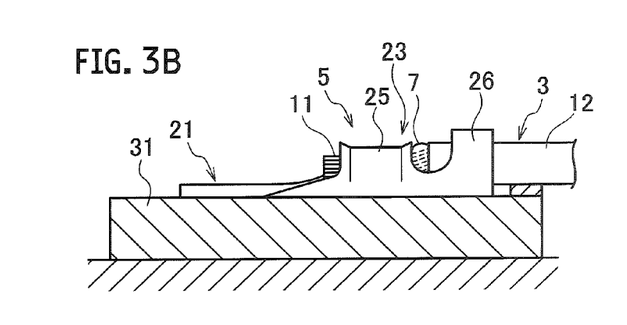
Figure 3C:
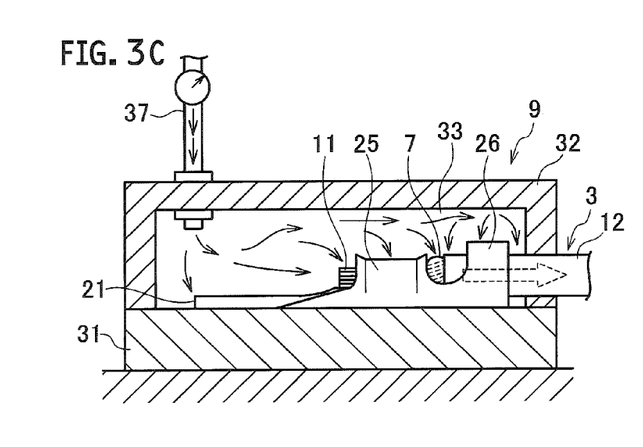
Figure 3D:
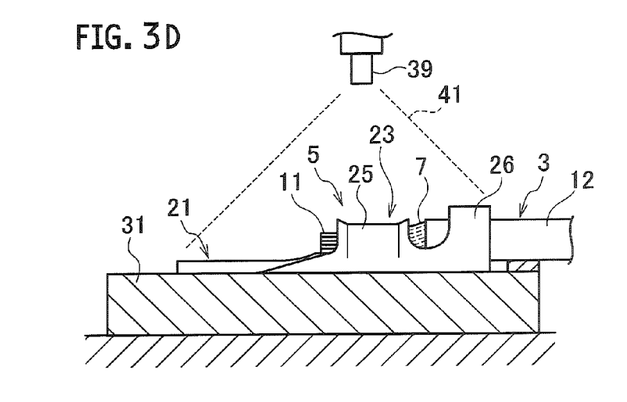

The electrical wire water-stop device 9 includes, in addition to the fixing board 31 and the upper cover 32, a water-stop agent dropping portion 38 (illustrated in FIG. 3A) and an black-light irradiation portion 39 (illustrated in FIG. 3D). The fixing board 31 is movable to a lower position or the like of the upper cover 32 and a lower position of the water-stop agent dropping portion 38.

Next, the water-stop treatment process performed by the electrical wire water-stop device 9 will be described with reference to FIGS. 3A to 3D. Note that, in FIGS. 3A to 3D, the terminal positioning portions 34 and 35 are omitted.

First, the terminal 5 obtained by connecting the electrical wire 3 is set to the terminal positioning portions 34 and 35 on the fixing board 31. Subsequently, as illustrated in FIG. 3A, the water-stop agent 7 is dropped between the conductor swaging portion 25 and the coating swaging portion 26 of the terminal 5 from the water-stop agent dropping portion 38 (dropping process). As illustrated in FIG. 3B, a liquid pool of the water-stop agent 7 is formed between the conductor swaging portion 25 and the coating swaging portion 26 by dropping the water-stop agent 7, and thus an entering portion to the electrical wire 3 is filled with the water-stop agent 7. Alternatively, a part of the water-stop agent 7 intrudes into gaps between the single wires 11a due to capillary action.

Subsequently, as illustrated in FIG. 3C, by making the upper cover 32 to be a sealed position, the pressure device supplies the pressurized air into the sealed chamber 33 to thereby put the sealed chamber 33 into a pressurized state. The other end side of the electrical wire 3 is drawn from the sealed chamber 33, and a pressure difference is generated between an ambient pressure of a part where the water-stop agent 7 is dropped and an inner pressure of the insulation coating portion 12. The water-stop agent 7 permeates the inside of the insulation coating portion 12 by the pressure difference. The pressurization is stopped after applying pressure for a predetermined time (water-stop agent permeating process).

After the water-stop agent permeating process, the electrical wire 3 having the terminal is cured until the water-stop agent 7 gets hardened (curing process).

After the curing process, as illustrated in FIG. 3D, the black light irradiation portion 39 irradiates the terminal 5 with the black light 41. Almost entire region of the terminal 5 is irradiated with the black light 41. Namely, the electrical connection portion 21 in addition to the electrical wire connection portion 23 is irradiated. A part to which the water-stop agent 7 adheres flashes by the irradiation with the black light 41, and the adherence state of the water-stop agent 7 is visually confirmed (inspection process). Subsequently, the water-stop agent 7 is allowed to stand for a predetermined time, and gets hardened. The embodiment is completed.

As illustrated in FIG. 4A, when the water-stop agent 7 adheres so as to completely cover the conductor 11 exposed from the insulation coating portion 12 and also an outer circumference at a nearby position exposed from the insulation coating portion 12, it can be determined that the water-stop agent 7 is completely filled into the gap in the insulation coating portion 12. In this case, on the condition that the water-stop agent 7 does not adhere to the electrical connection portion 21, the electric wire can be determined to be non-defective.

Figure 4B:
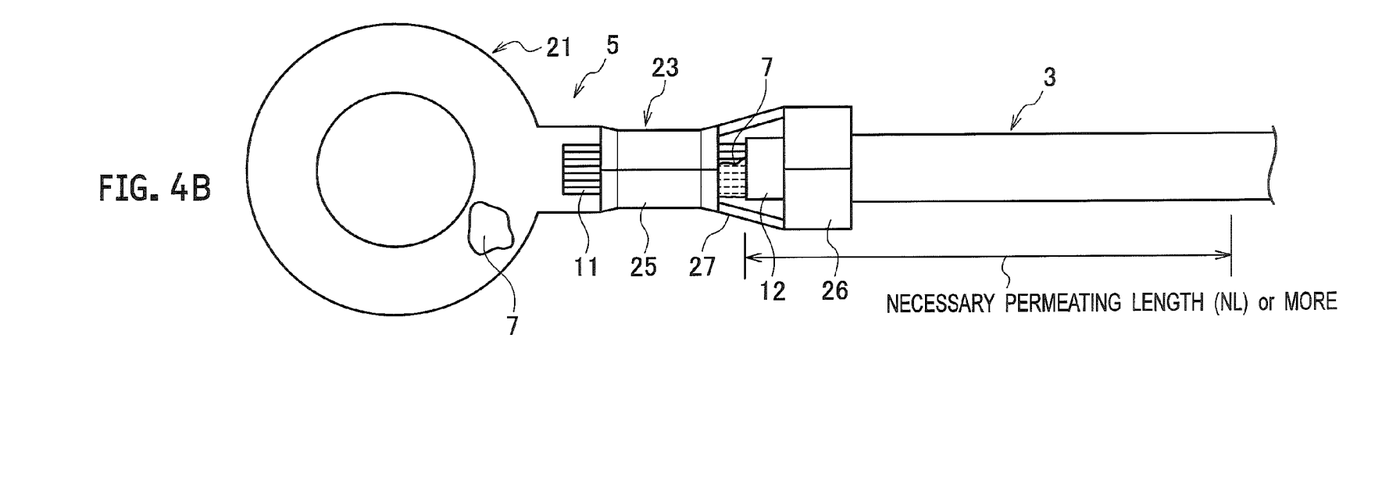
FIG. 4B is a plane view when the electrical wire having the terminal subjected to the water-stop treatment according to the first embodiment is defective.

As illustrated in FIG. 4B, when the water-stop agent 7 does not completely cover the conductor 11 exposed from the insulation coating portion 12 and also the outer circumference at the nearby position exposed from the insulation coating portion 12, and there is a part where the water-stop agent 7 does not adhere, it can be determined that the water-stop agent 7 may not be completely filled into the gap in the insulation coating portion 12. In this case, the electric wire is determined to be defective. Furthermore, even if the water-stop agent 7 adheres so as to completely cover the conductor 11 exposed from the insulation coating portion 12 and also an outer circumference at the nearby position exposed from the insulation coating portion 12, also when the water-stop agent 7 adheres to the electrical connection portion 21, the electric wire is determined to be defective.

As described above, the fluorescent agent is added to the water-stop agent 7 for performing water stop in the electrical wire 3, and thus a part where the water-stop agent 7 adheres flashes by the irradiation with the black light 41. Therefore, the adherence state of the water-stop agent 7 can be visually and easily confirmed, and whether or not the water-stop agent 7 is suitably filled into the electrical wire 3 can be easily and appropriately checked based on the adherence state of the water-stop agent 7.

The water-stop agent 7 is a silicone agent including the fluorescent agent. The hardened water-stop agent 7 preferably has a good sealing property, a greater extension ratio than that of the insulation coating portion 12, and a better bending property than that of the insulation coating portion 12. A property of the hardened silicone agent holds a stretch property and a bending property that are the same as those of the electrical wire with no water-stop agent 7 filled. The water-stop agent 7 includes an acrylic agent, an epoxy agent, a urethane agent, and the like in addition to the silicone agent. Each water-stop agent has a sealing property, but is not so excellent in elastic property and bending property as the silicone agent.

In the inspection process, the electrical connection portion 21 is also irradiated with the black light 41. Therefore, whether or not the water-stop agent 7 unnecessarily adheres to the electrical connection portion 21 can be also checked.

[Second Embodiment]

Figure 5A:
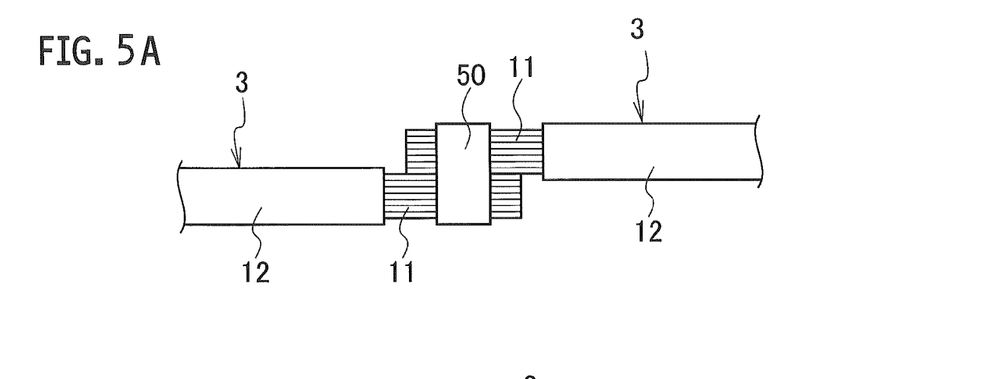
FIG. 5A is a plane view illustrating a state where two electrical wires are connected with each other via a coupling terminal.
Figure 5B:
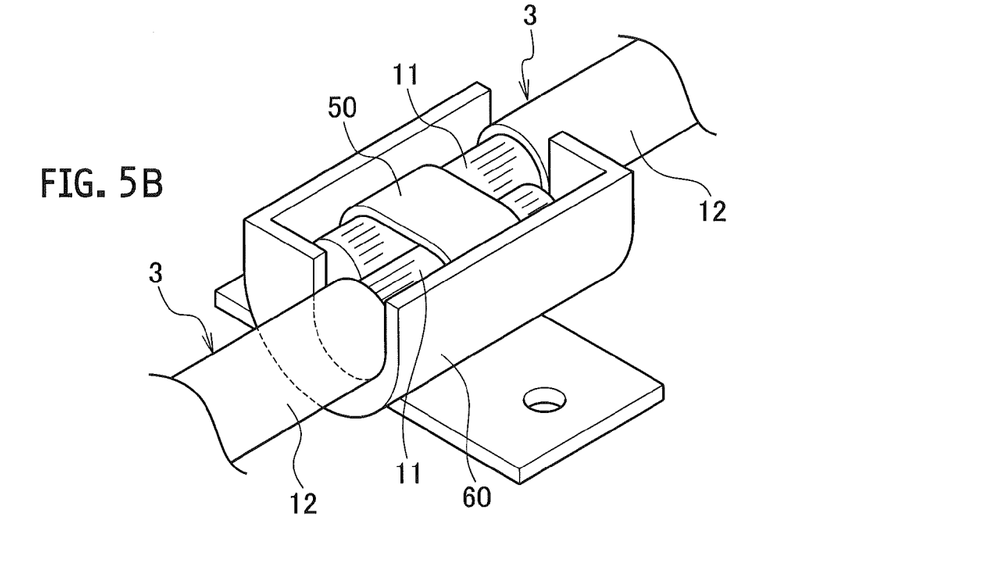
FIG. 5B is a perspective view illustrating a state where the two electrical wires are set in a water-stop tool.
Figure 5C:
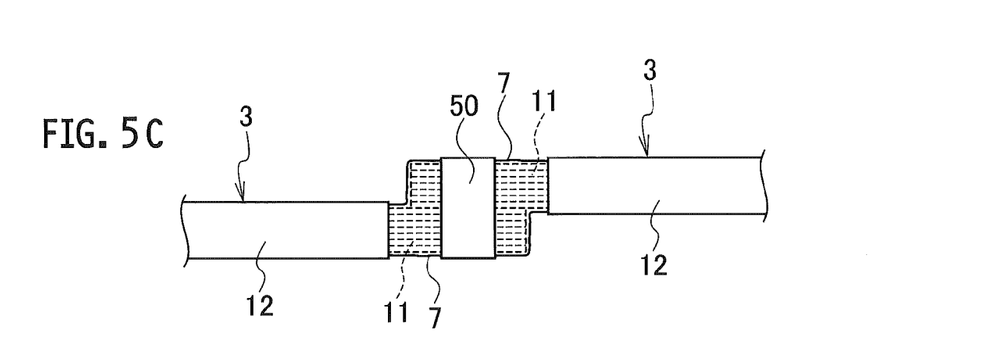
FIG. 5C is a plane view illustrating a state where water is stopped with a water-stop agent.

FIGS. 5A to 5C illustrate a second embodiment of a water-stop structure for electrical wire 3 having a terminal of the present invention.

As illustrated in FIG. 5A, two electrical wires 3 include the conductor 11 including the plurality of single wires, and the insulation coating portion 12 coating the outer circumference of the conductor 11. The end terminal parts of the insulation coating portions 12 of the two electrical wires 3 are peeled off, and thus the end terminal parts of the conductor 11 are exposed, respectively. The exposed conductors 11 of the two electrical wires 3 are coupled with each other via the coupling terminal 50. The two electrical wires 3 connected with each other via the coupling terminal 50 are filled with the water-stop agent 7 including the fluorescent agent 3 to thereby stop the water.

This water-stop treatment process is performed in almost the same way as the first embodiment by using a water-stop tool 60 illustrated in FIG. 5B and an upper cover (not illustrated) that is arranged above the water-stop tool 60 and that seals an inside of the water-stop tool 60, and the like. To give a brief description, the electrical wire 3 having the terminal is set in the water-stop tool 60, the water-stop agent 7 including the fluorescent agent is dropped onto the exposed conductor 11, with the result that the inside of a sealed chamber is put into a pressurized state by making the upper cover to be the sealed position. The other end side of the electrical wire 3 is drawn from the sealed chamber, and the pressure difference is generated between the ambient pressure of the part where the water-stop agent 7 is dropped and the inner pressure of the insulation coating portion 12. The water-stop agent 7 permeates the inside of the insulation coating portion 12, by the pressure difference. With this arrangement, as illustrated in FIG. 5C, the water-stop structure of performing water stop in each of the two electrical wires 3 is created.

Also according to the second embodiments, the fluorescent agent is added to the water-stop agent 7 for performing water stop in the electrical wire 3, and thus for the same reason as that of the first embodiment, the adherence state of the water-stop agent 7 can be visually and easily confirmed, and whether or not the water-stop agent 7 is suitably filled into the electrical wire 3 can be easily and appropriately checked based on the adherence state of the water-stop agent 7.

[Third Embodiment]

Figure 6A:
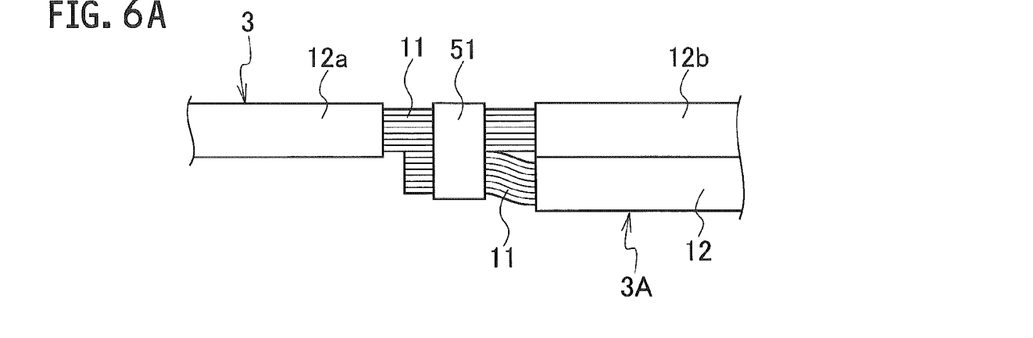
FIG. 6A is a plane view illustrating a state where a branch electrical wire is connected to an electrical wire an intermediate position of which is peeled off, via a relay terminal.
Figure 6B:
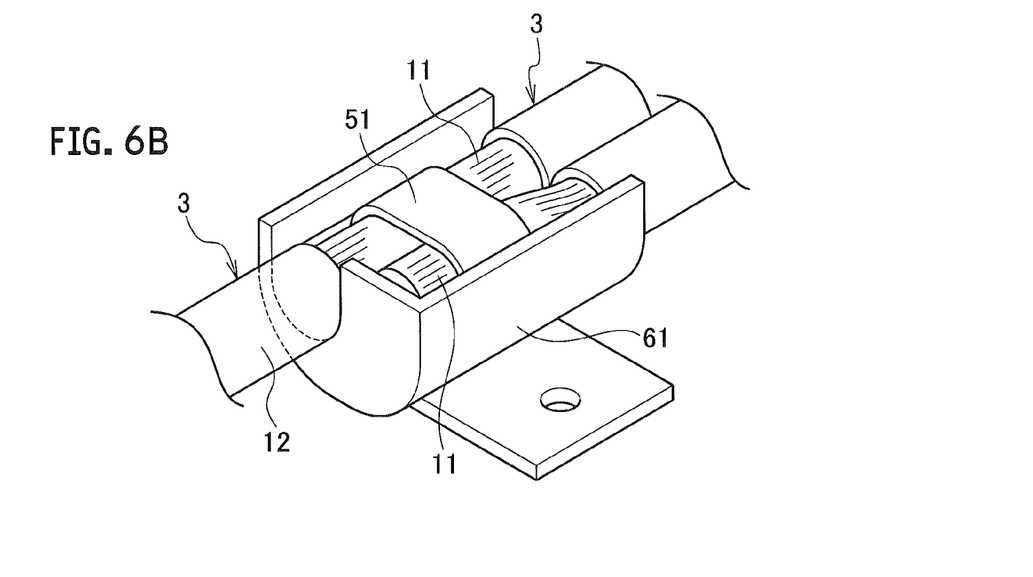
FIG. 6B is a perspective view illustrating a state where the electrical wires are set in a water-stop tool.
Figure 6C:
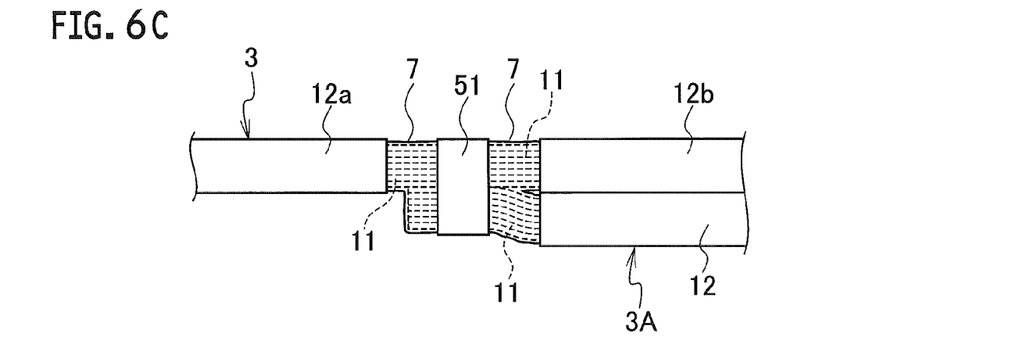
FIG. 6C is a plane view illustrating a state where water is stopped with a water-stop agent.

FIGS. 6A to 6C illustrate a third embodiment of the water-stop structure for electrical wire 3 having the terminal of the present invention.

As illustrated in FIG. 6A, two electrical wires 3 and 3A include the conductor 11 including the plurality of single wires, and the insulation coating portion 12 coating the outer circumference of the conductor 11. The insulation coating portion 12 of the electrical wire 3 is peeled off at the intermediate position thereof, and thus the conductor 11 is exposed. Namely, an intermediate position of the electrical wire 3 is peeled off. The end terminal part of the insulation coating portion 12 is peeled off as to another electrical wire 3A, and the end terminal part of the conductor 11 is exposed. The conductors 11 of both exposed electrical wires 3 and 3A are coupled with each other via a coupling terminal 51. The water-stop agent including the fluorescent agent is filled into the two electrical wires 3 connected via the coupling terminal 51, to thereby perform water stop.

This water-stop treatment process is performed in almost the same way as the first embodiment using a water-stop tool 61 as illustrated in FIG. 6B, an upper cover (not illustrated) that is arranged above the water-stop tool 61 and that seals an inside of the water-stop tool 61, and the like. To give a brief description, the electrical wires 3 and 3A having the terminal are set in the water-stop tool 61, the water-stop agent 7 including the fluorescent agent is dropped onto the exposed conductor 11, with the result that the inside of the sealed chamber is put into a pressurized state by making the upper cover to be the sealed position. Both end sides of the electrical wire 3 and the other end side of the electrical wire 3A are drawn from the sealed chamber, and the pressure difference is generated between the ambient pressure of the part where the water-stop agent 7 is dropped and the inner pressure of the insulation coating portion 12. The water-stop agent 7 permeates the inside of the insulation coating portion 12, by the pressure difference.

With this arrangement, as illustrated in FIG. 6C, the water-stop structure for performing water stop in each of the two electrical wires 3 is created. The electrical wire 3 has the water-stop structure at the electrical wire parts on both sides of the portion where an intermediate position of the electrical wire 3 is peeled off.

Also according to the third embodiments, the fluorescent agent is added to the water-stop agent 7 for performing water stop in the electrical wires 3 and 3A, and thus for the same reason as that of the first embodiment, the adherence state of the water-stop agent 7 can be visually and easily confirmed, and whether or not the water-stop agent 7 is suitably filled into the electrical wires 3 and 3A can be easily and appropriately checked based on the adherence state of the water-stop agent 7.

[Fourth Embodiment]

Figure 7A:
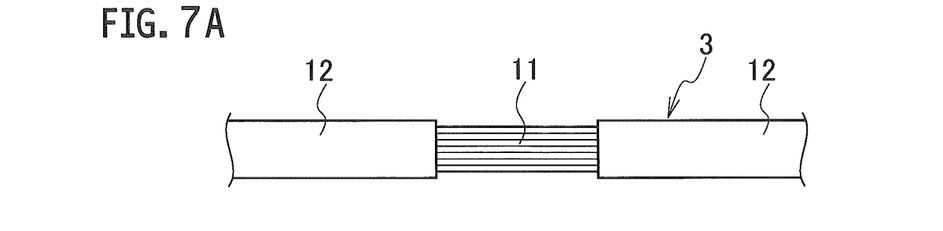
FIG. 7A is a plane view illustrating an electrical wire an intermediate position of which is peeled off.
Figure 7B:
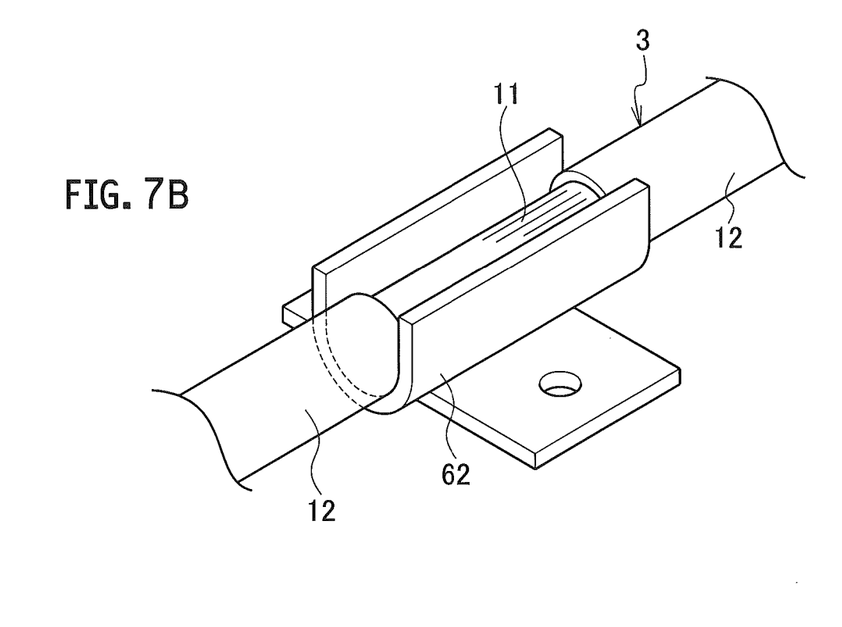
FIG. 7B is a perspective view illustrating a state where the electrical wire an intermediate position of which is peeled off is set in a water-stop tool.

FIGS. 7A to 7B illustrate a fourth embodiment of a water-stop structure for electrical wire 3 having no terminal of the present invention.

As illustrated in FIG. 7A, the insulation coating portion 12 of the electrical wire 3 is peeled off at the intermediate position thereof, and thus the conductor 11 is exposed. Note that the terminal as illustrated in FIG. 6 is not connected to the electrical wire 3. The water-stop agent 7 including the fluorescent agent is filled into the electrical wire 3 an intermediate position of which is peeled off, to thereby perform water stop.

Figure 7C:
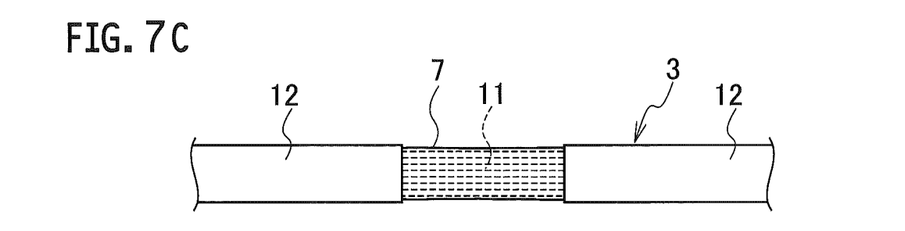
FIG. 7C is a plane view illustrating the electrical wire in which water is stopped with a water-stop agent.

This water-stop treatment process is performed in almost the same way as the first embodiment by using a water-stop tool 62 illustrated in FIG. 7B and an upper cover (not illustrated) that is arranged above the water-stop tool 62 and that seals an inside of the water-stop tool 62, and the like. To give a brief description, the electrical wire 3 having the terminal is set in the water-stop tool 62, the water-stop agent 7 including the fluorescent agent is dropped onto the exposed conductor 11, with the result that the inside of a sealed chamber is put into a pressurized state by making the upper cover to be the sealed position. Both end sides of the electrical wire 3 are drawn from the sealed chamber, and the pressure difference is generated between the ambient pressure of the part where the water-stop agent 7 is dropped and the inner pressure of the insulation coating portion 12. The water-stop agent 7 permeates the inside of the insulation coating portion 12, by the pressure difference. With this arrangement, as illustrated in FIG. 7C, the water-stop structure of performing water stop in the electrical wire 3 is created. The electrical wire 3 has the water-stop structure at the electrical wire parts on both sides of the portion where an intermediate position of the electrical wire 3 is peeled off. The portion where an intermediate position of the electrical wire 3 is peeled off is covered with tape, later.

Also according to the fourth embodiments, the fluorescent agent is added to the water-stop agent 7 for performing water stop in the electrical wire 3, and thus for the same reason as that of the first embodiment, the adherence state of the water-stop agent 7 can be visually and easily confirmed, and whether or not the water-stop agent 7 is suitably filled into the electrical wire 3 can be easily and appropriately checked based on the adherence state of the water-stop agent 7.

[Modification]

The silicone agent may be a silicone resin that is hardened by ultraviolet rays. Silicone resin of ultraviolet ray-hardened type that is hardened by ultraviolet rays is obtained by mixing a silicone oligomer that is a main component, with a light-polymerized initiator. When the ultraviolet rays are irradiated, the light-polymerized initiator reaches an excited state to thereby generate a radical for polymerizing the silicone oligomer.

Furthermore, according to the present embodiment, the inside of the sealed chamber 33 is put into a pressurized state, and the other end side of the electrical wire 3 drawn from the sealed chamber 33 is set under the atmosphere pressure lower than in the sealed chamber 33, and thus the water-stop agent 7 is permeated. However, a configuration may be such that the pressure difference between one end side and the other end side of the electrical wire 3 is generated by reducing the pressure of the other end side of the electrical wire 3 and the water-stop agent 7 is permeated into the electrical wire 3 by suction.

According to the first embodiment, one electrical wire 3 is used, but two or more electrical wires may be swaged and fixed to the terminal 5 together.

The application of the terminal 5 is not limited to the use for grounding, signaling, electrical power, and the like. The terminal 5 may be a joint terminal.

What is claimed is:

1. A method of manufacturing a water-stop structure for electrical wire including a terminal including an electrical wire connection portion and an electrical wire in which an outer circumference of a conductor including a plurality of single wires is coated with an insulation coating portion and which is swaged to be fixed to the electrical wire connection portion, a water-stop agent being filled into a gap in the insulation coating portion to thereby perform water stop in the electrical wire, the method comprising:
    a step of dropping the water-stop agent including a fluorescent agent onto an exposed part of the conductor exposed by peeling off the insulation coating portion;
    a water-stop agent permeating step of generating a pressure difference between an ambient pressure of a part where the water-stop agent is dropped and an inner pressure of the insulation coating portion to thereby pour the water-stop agent into the insulation coating portion; and
    an inspection step of irradiating the exposed part of the conductor in which the water-stop agent is dropped, with black light, wherein
    the water-stop agent including the fluorescent agent is a silicone agent hardened with moisture.

2. The method of manufacturing a water-stop structure for electrical wire according to claim 1, wherein the terminal includes an electrical connection portion, and wherein the electrical connection portion is also irradiated with the black light.

3. A method of manufacturing a water-stop structure for electrical wire including a conductor including a plurality of single wires and an insulation coating portion coating an outer circumference of the conductor, a water-stop agent being filled into a gap in the insulation coating portion to thereby perform water stop in an electrical wire, the method comprising:
    a step of dropping the water-stop agent including a fluorescent agent onto an exposed part of the conductor exposed by peeling off the insulation coating portion;
    a water-stop agent permeating step of generating a pressure difference between an ambient pressure of a part where the water-stop agent is dropped and an inner pressure of the insulation coating portion to thereby pour the water-stop agent into the insulation coating portion; and
    an inspection step of irradiating the exposed part of the conductor in which the water-stop agent is dropped, with the black light, wherein
    the water-stop agent including the fluorescent agent is a silicone agent hardened with moisture.

* * * * *